June 2, 1964 P. F. GIRARD 3,135,483
AUXILIARY BOOM CONTROL SYSTEM FOR ROGALLO TYPE WING AIRCRAFT
Filed Aug. 20, 1962 2 Sheets-Sheet 1

INVENTOR.
PETER F. GIRARD
BY
Knox & Knox

June 2, 1964 P. F. GIRARD 3,135,483
AUXILIARY BOOM CONTROL SYSTEM FOR ROGALLO TYPE WING AIRCRAFT
Filed Aug. 20, 1962 2 Sheets-Sheet 2

INVENTOR.
PETER F. GIRARD
BY
*Knox & Knox*

3,135,483
AUXILIARY BOOM CONTROL SYSTEM FOR
ROGALLO TYPE WING AIRCRAFT
Peter F. Girard, La Mesa, Calif., assignor to The Ryan
Aeronautical Co., San Diego, Calif.
Filed Aug. 20, 1962, Ser. No. 218,018
7 Claims. (Cl. 244—75)

The present invention relates generally to aircraft and more particularly to an auxiliary boom control system for Rogallo type wing aircraft.

The primary object of this invention is to provide a control system for Rogallo type wing aircraft wherein auxiliary booms are incorporated into the wing adjacent the tips and used to change the effective angle of attack of the tip portions of the wing and thereby control the aircraft.

Another object of this invention is to provide an auxiliary boom control system in which the wing tip portions can be moved differentially or collectively for roll and pitch control.

Another object of this invention is to provide a control system incorporating portions of the aircraft structure in a novel manner and being concentrated substantially in the rear of the aircraft.

A further object of this invention is to provide a control system which is operated by conventional pilot's controls in a normal instinctive manner, the control forces being considerably less than those required to control an unmodified flexible wing.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

*General Structure*

Figure 1:
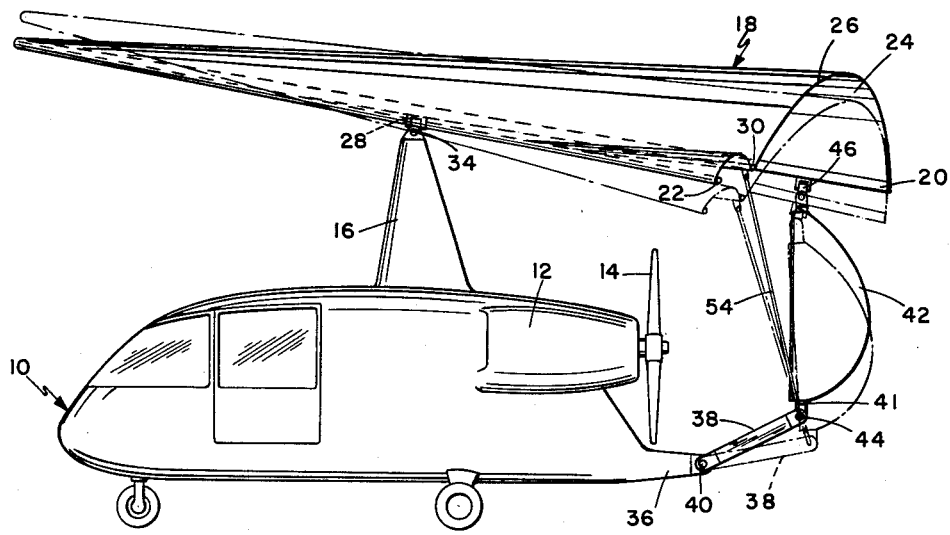
FIGURE 1 is a side elevation view of an aircraft incorporating the control system.

The aircraft has an airframe 10, illustrated as a closed cabin type fuselage, with a rear mounted engine unit 12 driving a pusher propeller 14. On top of the airframe 10 is an upright pylon 16 to which is attached a Rogallo type wing, generally indicated at 18. The type of airframe, the engine installation and location and the pylon or comparable structure for supporting the wing may vary considerably, that illustrated merely being an example.

The wing 18 is of the type generally referred to as a Rogallo wing and is of substantially triangular form with a longitudinal central keel 20 and swept back leading edge members 22 extending from the forward end of the keel. Attached to the keel 20 and members 22 is a thin flexible membrane 24 which constitutes the aerodynamic lifting surface and is free at the trailing edge 26. The leading edge members 22 are normally held in spread position by a transverse spreader bar 28. Adjacent each tip of wing 18 is an auxiliary boom 30 pivotally attached to the leading edge member 22 by a bracket 32 to swing in a generally vertical plane and extending chordwise of the wing substantially parallel to keel 20. The booms 30 extend to the trailing edge 26 and are secured along their full length to membrane 24.

Keel 20 is attached to pylon 16 by a universal coupling 34 which allows the wing to pivot about pitch and roll axes. At the rear of airframe 10 is a rearwardly extended portion 36 on which is mounted a yoke 38 which can swing in a generally vertical plane on a transverse shaft 40 connecting one end of the yoke to said extended portion. Connected between the other end of yoke 38 and the rear end of keel 20 is a vertical post 41 carrying a rudder 42, the lower end of the post having a coupling 44 which is pivotal on an axis parallel to the axis of shaft 40. The upper end of the post 41 is coupled to keel 20 by a universal coupling 46 pivotal about pitch and roll axes of the wing 18 and, in addition, the rudder is free to swing about the vertical axis of post 41 for directional control.

*Control System*

Figure 4:
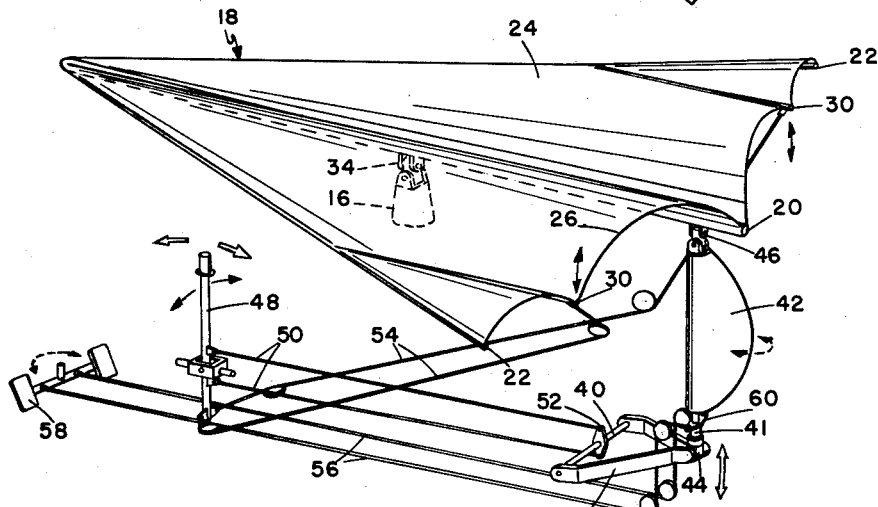
FIGURE 4 is a diagrammatic representation of one practical form of the control system.

The control system illustrated in FIGURE 4 is of very simple type using control cables and is intended only to show the control functions. A conventional control stick 48 is coupled by pitch control cables 50 to a horn 52 fixed to shaft 40. Lateral control cables 54 extend from the control stick 48 to the rear ends of auxiliary booms 30, and rudder cables 56 are connected from a rudder bar 58 to a horn 60 at the lower end of rudder 42. The system is substantially conventional and corresponds to the elevator, aileron and rudder control means, respectively, of a conventional aircraft. It should be understood that the cables may be routed in any suitable manner on proper pulley arrangements, according to the specific design of the aircraft structure. Alternatively, fluid pressure means, electrical actuators, or other systems may be used to operate the controls.

*Operation*

The Rogallo type wing is a very stable aerodynamic element and the common means for obtaining directional control is to shift the center of gravity of the aircraft relative to the center of lift. This has the same effect as tilting the wing, the resultant offset lift causing the required change in direction.

Pitch control of the Rogallo type wing is obtained by changing the effective angle of attack of the wing, thereby changing the lift factor. This is accomplished by moving control stick 48 fore and aft, as indicated by outlined directional arrows in FIGURE 4. The resultant rotation of shaft 40 raises or lowers yoke 38, as indicated by corresponding arrows, which, being connected to the keel 20, raises and lowers the rear end of wing 18, so changing the angle of attack. Two different positions of the structure are illustrated in FIGURE 1 as an example. Rudder action, indicated by broken line directional arrows, is conventional.

Figure 2:
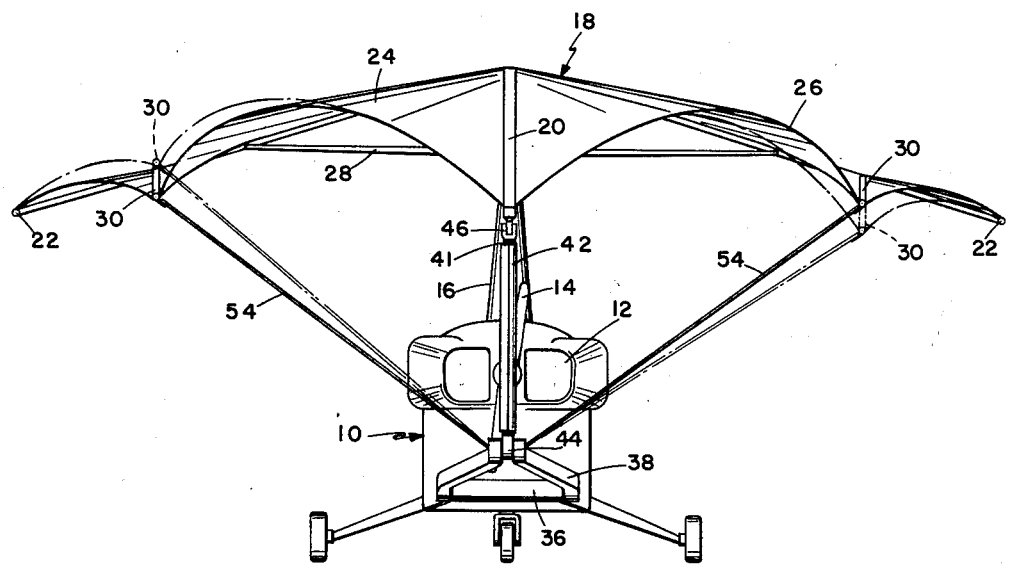
FIGURE 2 is a rear elevation view of the aircraft.
Figure 3:
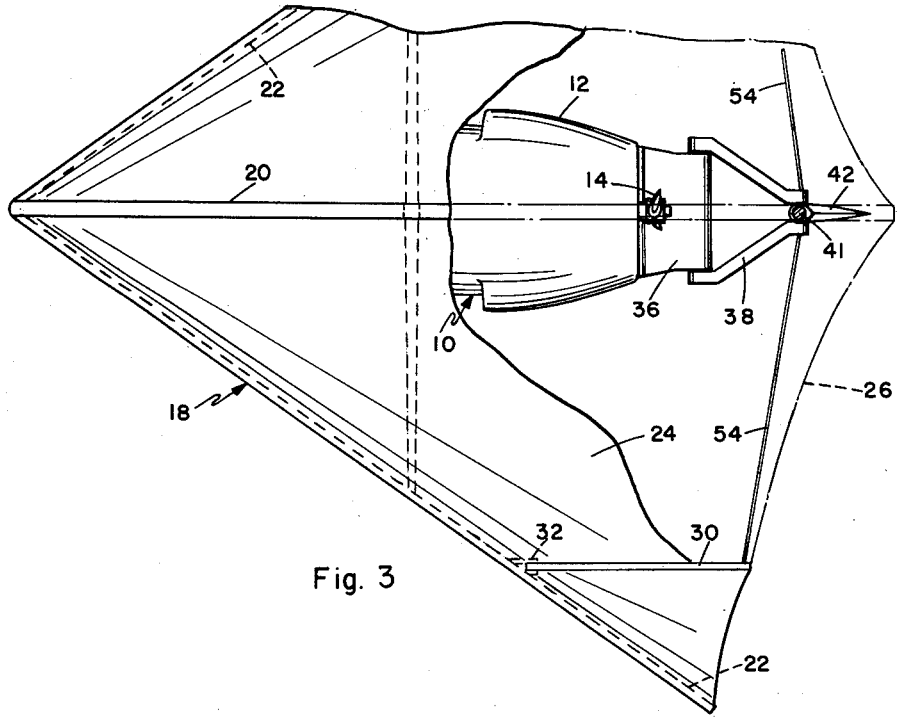
FIGURE 3 is a partial top plan view thereof with a portion of the wing cut away.

Lateral control is obtained by moving control stick 48 from side to side, indicated by solid arrows, the cables 54 pulling down on one auxiliary boom 30 and allowing the other to rise, as indicated in broken line in FIGURE 2. In flight, the free trailing edge of the membrane 24 tends to bow upwardly under aerodynamic load and no means is necessary to actually raise the auxiliary booms. The slackening or paying out of either cable 54 simply allows the appropriate boom to rise at the trailing edge. On the side of the wing on which the boom 30 is pulled down, the effective average angle of attack is increased, resulting in an increase in lift. Conversely, on the other side of the wing the effective angle of attack is decreased, with a decrease in lift. The resultant unequal lift causes a rolling motion in the manner of aileron action and provides the required change of direction.

It will be evident that the moving of the booms 30 is considerably easier than control motion of the entire wing 18. The control forces required are thus minimized and simple manual control of even a large Rogallo type wing aircraft is feasible.

In addition to being movable differentially for lateral control, the booms 30 can also be moved collectively up or down for pitch control, by fore and aft motion of the control stick 48. As illustrated, the cables 54 are coupled to control stick 48 below its pivot to achieve this result, but other connecting means or control devices may be used. Collective downward motion of booms 30 increases the average angle of attack of the entire wing 18, while collective upward motion decreases the average angle of attack. Since the tip portions of the wing wherein the auxiliary booms 30 are located are well aft of the aerodynamic center of the wing, a considerable pitching moment is obtainable. Thus control in pitch and roll axes is accomplished by motion of small portions of the wing with small control forces, avoiding the feedback to the pilot's controls of large forces caused by relative motion of the entire wing and the airframe as in flexible wing aircraft not employing the auxiliary boom arrangement.

Even though the entire wing 18 need not move relative to the airframe 10 in normal control, the pivotal mounting of wing to airframe about the pitch axis is necessary since the wing is required to move through a considerable range in angle of attack as a whole, particularly at takeoff and landing. It is not essential that the wing be pivotal about the rolling axis as illustrated, but is desirable for optimum control action by permitting an inclination of the total effective lift vector relative to the center of gravity of the aircraft.

It is understood that minor variation from the form of the invention disclosed herein may be made without departure from the spirit and scope of the invention, and that the specification and drawings are to be considered as merely illustrative rather than limiting.

I claim:
1. In an aircraft having an airframe and a Rogallo type lifting wing mounted on said airframe, a control system, comprising:
   rigid boom members flexibly attached to portions of said wing and extending substantially chordwise of the wing adjacent the tips thereof;
   control means connected to said boom members;
   said control means being operable to move said boom members selectively differentially and collectively in substantially vertical planes, thereby changing the effective angle of attack of portions of the wing.

2. In an aircraft having an airframe, a lifting wing mounted above said airframe and having a longitudinal keel, a pair of leading edge members extending on opposite sides of said keel, and a flexible membrane constituting a lifting surface fixed to and extending between said keel and leading edge members, a control system, comprising:
   boom members extending rearwardly from said leading edge members and being attached to said membrane;
   control means connected to said boom members;
   said control means being operable to move said boom members in substantially vertical planes, thereby changing the effective angle of attack of portions of said wing.

3. In an aircraft having an airframe, a lifting wing mounted above said airframe and having a longitudinal keel, a pair of leading edge members extending on opposite sides of said keel, and a flexible membrane constituting a lifting surface fixed to and extending between said keel and leading edge members, a control system, comprising:
   boom members extending rearwardly from said leading edge members and being attached to said membrane;
   said boom members being pivotally connected to said leading edge members to swing in substantially vertical planes;
   control means connected to said boom members;
   said control means being operable to move said boom members selectively upwardly and downwardly, thereby changing the effective angle of attack of portions of the wing.

4. In an aircraft having an airframe, a lifting wing mounted above said airframe and having a longitudinal keel, a pair of leading edge members extending on opposite sides of said keel, a flexible membrane constituting a lifting surface fixed to and extending between said keel and leading edges, said wing being pivotally mounted for movement about an axis transverse to said keel, a control system, comprising:
   boom members extending rearwardly from said leading edge members inwardly of the ends thereof and being attached to said membrane;
   said boom members being pivotally connected to said leading edge members to swing in substantially vertical planes;
   control means connected to said boom members;
   said control means being operable to swing said boom members selectively differentially and collectively, thereby changing the effective angle of attack of portions of said wing;
   and pitch control means connected between said airframe and said wing to move the wing about the said pivotal axis thereof.

5. The structure according to claim 4, wherein said pitch control means includes a substantially vertical post pivotally connected to said keel and to said airframe;
   and means to move said post selectively upwardly and downwardly.

6. The structure according to claim 5 and including a rudder pivotally mounted on said post;
   and means to swing said rudder substantially about the vertical axis of said post.

7. In an aircraft having an airframe, a lifting wing mounted above said airframe and having a longitudinal keel, a pair of leading edge members extending on opposite sides of said keel, a flexible membrane constituting a lifting surface fixed to and extending between said keel and leading edges, said wing being pivotally mounted for movement about an axis transverse to said keel, a control system, comprising:
   boom members extending rearwardly from said leading edge members and being attached to said membrane;
   said boom members being pivotally connected to said leading edge members to swing in substantially vertical planes;
   control means connected to said boom members;
   said control means being operable to swing said boom members selectively differentially and collectively, thereby changing the effective angle of attack of portions of said wing;
   a yoke pivotally mounted on the rear of said airframe to swing in a substantially vertical plane;
   a post pivotally connected between said yoke and said keel;
   a rudder pivotally mounted on said post to swing about the vertical axis of the post;
   pitch control means connected to said yoke to swing the yoke and thereby move said keel to change the angle of attack of the entire wing;
   and means to swing said rudder about the pivotal axis thereof.

References Cited in the file of this patent
UNITED STATES PATENTS

| | | |
|---|---|---|
| 1,058,634 | Scott | Apr. 8, 1913 |
| 2,406,374 | Holt | Aug. 27, 1946 |
| 2,623,712 | Spratt | Dec. 30, 1952 |

OTHER REFERENCES

Aviation Week and Space Tech., Sept. 19, 1960, pages 57, 59 and 63.